United States Patent
Gabriel et al.

(10) Patent No.: US 10,900,591 B2
(45) Date of Patent: Jan. 26, 2021

(54) HIGH PRESSURE ANTI-CAVITATION CAGE

(71) Applicant: FISHER CONTROLS INTERNATIONAL LLC, Marshalltown, IA (US)

(72) Inventors: Thomas N. Gabriel, Marshalltown, IA (US); Raymond W. Micheel, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 119 days.

(21) Appl. No.: 15/721,526

(22) Filed: Sep. 29, 2017

(65) Prior Publication Data
US 2019/0101228 A1   Apr. 4, 2019

(51) Int. Cl.
| | |
|---|---|
| *F16K 47/08* | (2006.01) |
| *B33Y 80/00* | (2015.01) |
| *F16K 3/34* | (2006.01) |
| *F16K 3/24* | (2006.01) |

(52) U.S. Cl.
CPC .............. *F16K 47/08* (2013.01); *B33Y 80/00* (2014.12); *F16K 3/24* (2013.01); *F16K 3/34* (2013.01); *Y10T 137/86718* (2015.04); *Y10T 137/86734* (2015.04); *Y10T 137/86791* (2015.04)

(58) Field of Classification Search
CPC .... F16K 47/08; F16K 3/24; Y10T 137/86791; Y10T 137/86718; Y10T 137/86734
See application file for complete search history.

(56) References Cited

U.S. PATENT DOCUMENTS

| | | | | |
|---|---|---|---|---|
| 3,722,854 A | * | 3/1973 | Parola ..................... | F16K 47/08 137/625.28 |
| 3,908,698 A | * | 9/1975 | Baumann .................. | F16K 1/54 137/625.3 |

(Continued)

FOREIGN PATENT DOCUMENTS

| | | |
|---|---|---|
| EP | 3009723 A1 | 4/2016 |
| WO | WO-2017018173 A1 | 2/2017 |

OTHER PUBLICATIONS

International Search Report for PCT/US2018/050586 dated Dec. 13, 2018, 5 pgs.

(Continued)

*Primary Examiner* — Matthew W Jellett
*Assistant Examiner* — Christopher D Ballman
(74) *Attorney, Agent, or Firm* — Marshall, Gerstein & Borun LLP

(57) ABSTRACT

A control valve has a cage disposed within a valve body adjacent a valve seat and proximate a valve plug to provide guidance for the valve plug. The cage includes a solid, unitary circumferential wall with inlet passages adjacent one of an inner surface or an outer surface and outlet passages adjacent the other of the inner and outer surface. An annular cavity is spaced apart from the inner and outer surfaces and is connected to the inlet passages. Intermediate passages are connected to the annular cavity and recovery plenums interconnect the intermediate passages and the outlet passages. The recovery plenums have cross-sectional areas that are larger than a cross-sectional areas of the intermediate and outlet passages.

13 Claims, 6 Drawing Sheets

(56) References Cited

U.S. PATENT DOCUMENTS

| | | | | |
|---|---|---|---|---|
| 3,917,221 A * | 11/1975 | Kubota | ................... | F16K 47/08 |
| | | | | 137/625.37 |
| 3,954,124 A * | 5/1976 | Self | .......................... | F16K 3/34 |
| | | | | 138/42 |
| 4,108,210 A | 8/1978 | Luthe et al. | | |
| 4,384,592 A * | 5/1983 | Ng | ............................ | F16K 3/34 |
| | | | | 137/625.3 |
| 4,860,993 A * | 8/1989 | Goode | ................... | F16K 47/08 |
| | | | | 251/127 |
| 4,921,014 A * | 5/1990 | Tartaglia | ................. | F16K 47/08 |
| | | | | 137/494 |
| 5,018,703 A * | 5/1991 | Goode | ................... | F16K 47/08 |
| | | | | 137/625.3 |
| 5,020,571 A * | 6/1991 | Tartaglia | ................. | F16K 47/08 |
| | | | | 137/625.3 |
| 6,394,134 B1 * | 5/2002 | Kwon | .................... | F16K 47/08 |
| | | | | 137/625.3 |
| 6,807,985 B2 * | 10/2004 | Stares | .................... | F16K 47/08 |
| | | | | 137/625.33 |
| 6,926,032 B2 * | 8/2005 | Nawaz | ................... | F16K 47/04 |
| | | | | 137/625.33 |
| 7,448,409 B2 * | 11/2008 | Micheel | ................. | F16K 3/246 |
| | | | | 137/625.37 |
| 8,033,300 B2 | 10/2011 | McCarty | | |
| 8,950,431 B2 * | 2/2015 | Kim | ....................... | F16K 47/08 |
| | | | | 137/625.33 |
| 9,528,632 B2 * | 12/2016 | Glaun | ..................... | F16K 47/04 |
| 9,587,764 B2 | 3/2017 | Juhnke et al. | | |
| 9,677,687 B2 * | 6/2017 | Yli-Koski | ......... | F16L 55/02718 |
| 2007/0028977 A1 * | 2/2007 | Goulet | ..................... | F15C 1/16 |
| | | | | 137/809 |
| 2009/0026395 A1 * | 1/2009 | Perrault | .................. | F16K 47/08 |
| | | | | 251/127 |
| 2016/0341335 A1 | 11/2016 | Adams et al. | | |
| 2017/0138507 A1 * | 5/2017 | Kluz | ....................... | F16K 47/08 |

OTHER PUBLICATIONS

Written Opinion for PCT/US2018/050586 dated Dec. 13, 2018, 12 pgs.
Cavitrol III Trims Product Bulletin dated Mar. 2012, 12 pgs.
HP Control Valve Instructional Manual dated Jul. 2017, 36 pgs.

* cited by examiner

HIGH PRESSURE ANTI-CAVITATION CAGE

FIELD OF THE DISCLOSURE

This disclosure relates generally to control valves and, more particularly, high pressure anti-cavitation cages for control valves.

BACKGROUND

In typical control valves, a valve cage may provide guidance for a valve plug as the valve plug moves from a closed position in which the valve plug sealingly engages a valve seat to an open position in which the valve plug is disposed away from the valve seat. When the valve is in the open position, fluid flows from a valve inlet, passes through a port between the valve seat and the valve plug, passes through the valve cage, and exits through a valve outlet. In addition to guiding the valve plug, a valve cage can also be used for additional functions, such as the reduction/elimination of cavitation in high pressure applications.

However, current multiple stage anti-cavitation cages have to be assembled with multiple parts, which results in complex manufacturing and assembly and increased manufacturing costs. For example, a typical multi-stage anti-cavitation cage having three designed pressure drops to ensure that fluid does not reach a pressure below the vapor pressure causing cavitation has to be assembled from three different components: an inner cage, a middle sleeve, and an outer sleeve, due to the continually changing passage size required to provide the pressure drops. Each of these components are manufactured by drilling multiple holes through the component. Multiple components are required due to the limited ability to drill multiple size holes, small to large, in an inside/out direction, to control pressure staging as fluid passes through the cage. In addition, drilled hole components are also very cumbersome, time consuming, and costly to produce. Some drilled hole components may contain thousands of holes and the only real feasible way to produce passages through the components is was to drill them with a ⅛ inch or smaller drill bit. Acceptance criteria exists that allows a percentage of drill bits to break and be left in the component and this process requires the use of special drilling machines that have a high degree of accuracy.

Once all three components are machined, they are assembled, and pinned or otherwise secured together. Once assembled, there are also additional finish machine operations required to ensure proper fit of the cage in the control valve. Therefore, one problem with current multiple stage anti-cavitation cages is the manufacturing complexity due to the number of holes, drilling operations, assembly, and finish machining required, which also increases manufacturing time and cost. In addition, due to the manufacturing limitations in drilling the holes, currently multiple stage anti-cavitation cages can only be made for "flow down" (e.g., the fluid enters the outside surface of the cage and passes from the outside surface to the center of the cage) valve applications.

BRIEF SUMMARY OF THE DISCLOSURE

In accordance with one exemplary aspect of the present invention, a control valve comprises a valve body having an inlet and an outlet, a valve seat positioned in a passageway of the valve body between the inlet and the outlet, a valve plug positioned within the valve body, and a cage disposed within the valve body adjacent the valve seat and proximate the valve plug to provide guidance for the valve plug. The valve plug is movable between a closed position, in which the valve plug sealingly engages the valve seat, and an open position, in which the valve plug is spaced away from the valve seat. The cage comprises a solid, unitary circumferential wall having an inner surface and an outer surface, a plurality of inlet passages adjacent one of the inner or outer surfaces and a plurality of outlet passages adjacent the other of the inner or outer surface. An annular cavity is spaced apart from the inner surface and the outer surface and is connected to the plurality of inlet passages. A plurality of intermediate passages are connected to the annular cavity and a plurality of recovery plenums interconnect the intermediate passages and the outlet passages. The plurality of recovery plenums each have a cross-sectional area that is larger than a cross-sectional area of the intermediate and outlet passages.

In accordance with another exemplary aspect of the present invention, a cage for a control valve comprises a solid, unitary circumferential wall having an inner surface and an outer surface, a plurality of inlet passages adjacent one of the inner or outer surfaces and a plurality of outlet passages adjacent the other of the inner or outer surface. An annular cavity is spaced apart from the inner surface and the outer surface and is connected to the plurality of inlet passages. A plurality of intermediate passages are connected to the annular cavity and a plurality of recovery plenums interconnect the intermediate passages and the outlet passages. The plurality of recovery plenums each have a cross-sectional area that is larger than a cross-sectional area of the intermediate and outlet passages.

In further accordance with any one or more of the foregoing exemplary aspects of the present invention, a control valve or cage for a control valve may further include, in any combination, any one or more of the following preferred forms.

In one preferred form, one end of each of the plurality of inlet passages is chamfered.

In another preferred form, the inlet passages are positioned adjacent the inner surface and the outlet passages are positioned adjacent the outer surface.

In another preferred form, the inlet passages are positioned adjacent the outer surface and the outlet passages are positioned adjacent the inner surface.

In another preferred form, a second plurality of inlet passages are adjacent one of the inner surface or the outer surface and are longitudinally offset from the plurality of inlet passages. A second annular cavity is spaced apart from the inner surface and the outer surface, is connected to the second plurality of inlet passages, and is longitudinally and radially offset from the annular cavity. A second plurality of intermediate passages are connected to the second annular cavity. A second plurality of outlet passages are adjacent the other of the inner surface or the outer surface and are longitudinally offset from the plurality of outlet passages. A second plurality of recovery plenums interconnect the second intermediate passages and the second outlet passages and each have a cross-sectional area that is larger than a cross-sectional area of the second intermediate passages and a cross-sectional area of the second outlet passages.

In another preferred form, the annular cavity has a cross-sectional shape having a corner at the vertex.

In another preferred form, the plurality of recovery plenums each have a cross-sectional shape having a corner at the vertex.

In accordance with another exemplary aspect of the present invention, a control valve comprises a valve body having an inlet and an outlet, a valve seat positioned in a passageway of the valve body between the inlet and the outlet, a valve plug positioned within the valve body, and a cage disposed within the valve body adjacent the valve seat and proximate the valve plug to provide guidance for the valve plug. The valve plug is movable between a closed position, in which the valve plug sealingly engages the valve seat, and an open position, in which the valve plug is spaced away from the valve seat. The cage comprises a solid, unitary circumferential wall having an inner surface and an outer surface, a plurality of inlet passages adjacent one of the inner or outer surfaces and a plurality of outlet passages adjacent the other of the inner or outer surface. The cage also includes a means for providing a first pressure drop between the plurality of inlet passages and the plurality of outlet passages and a means for providing a second pressure drop between the plurality of inlet passages and the plurality of outlet passages.

In further accordance with any one or more of the foregoing exemplary aspects of the present invention, a control valve may further include, in any combination, any one or more of the following preferred forms.

In one preferred form, the inlet passages are positioned adjacent the inner surface and the outlet passages are positioned adjacent the outer surface.

In another preferred form, the inlet passages are positioned adjacent the outer surface and the outlet passages are positioned adjacent the inner surface.

In another preferred form, the means for providing a first pressure drop between the plurality of inlet passages and the plurality of outlet passages comprises an annular cavity formed in the circumferential wall. The annular cavity is spaced apart from the inner surface and the outer surface and is connected to the plurality of inlet passages.

In another preferred form, the means for providing a second pressure drop between the plurality of inlet passage and the plurality of outlet passages comprises a plurality of recovery plenums connected to one of the plurality of outlet passages and a plurality of intermediate passages interconnecting the annular cavity and the plurality of recovery plenums. The plurality of recovery plenums each have a cross-sectional area that is larger than a cross-sectional area of the intermediate passages and a cross-sectional area of the outlet passages.

In another preferred form, the annular cavity has a cross-sectional shape having a corner at the vertex and the plurality of recovery plenums each have a cross-sectional shape having a corner at the vertex.

DETAILED DESCRIPTION

The present invention provides a multiple stage anti-cavitation cage for a control valve that is a single, unitary component. Therefore, no assembly of multiple components is required, which simplifies the manufacture and decreases manufacturing time and cost. In addition, the present invention can be designed for use in "flow up" or "flow down" applications, as discussed in more detail below, which was not possible with current multiple stage anti-cavitation cage designs.

Figure 1:
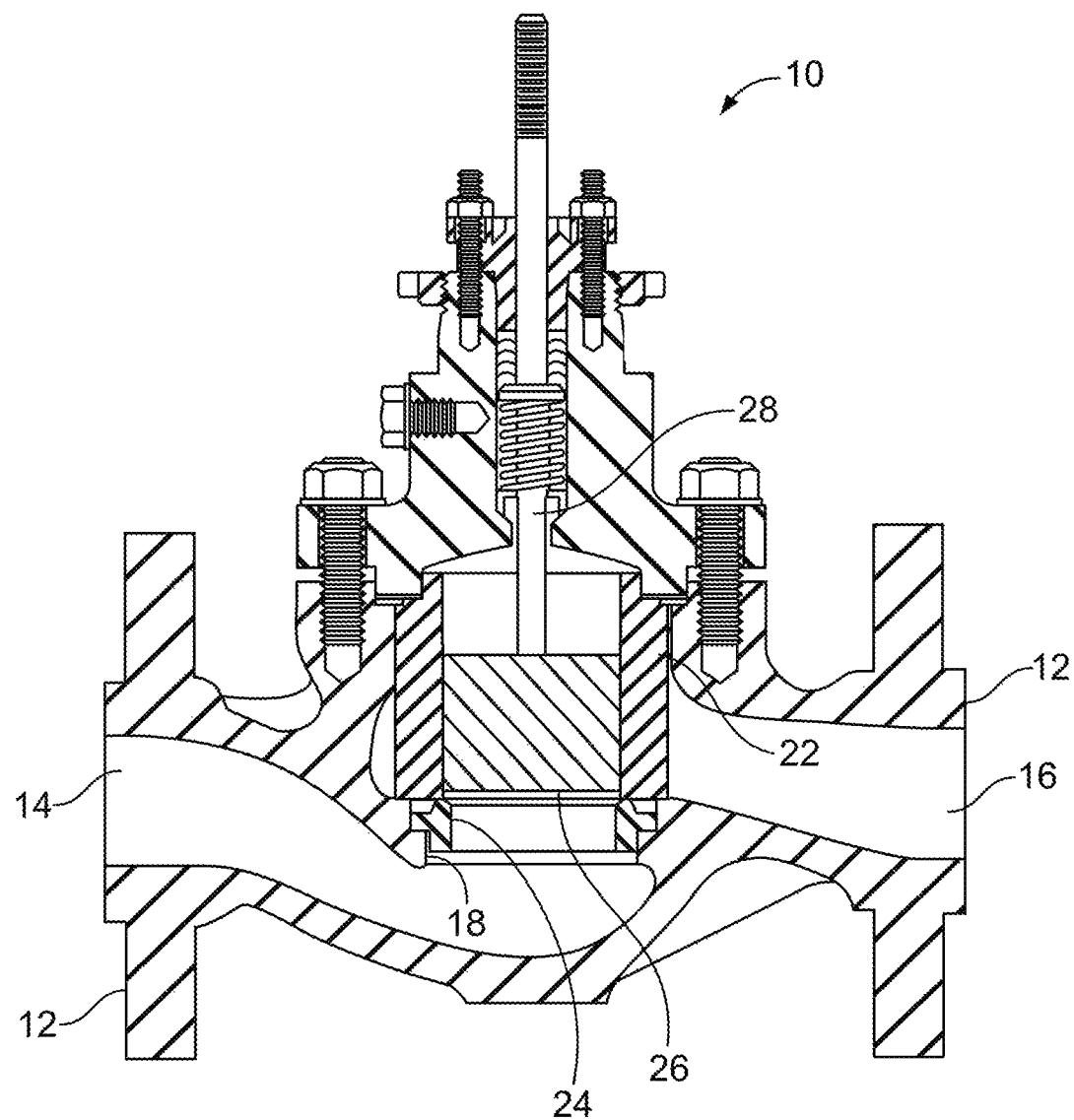
FIG. 1 is a cross-sectional view of an example control valve.

Referring to FIG. 1, a typical control valve 10 is shown. Control valve 10 generally includes a valve body 12 having an inlet 14 and an outlet 16 and a passageway 18 disposed between inlet 14 and outlet 16, which would be configured for a "flow up" application. However, inlet 14 and outlet 16 could also be reversed and control valve 10 used in a "flow down" application. A valve seat 24 is disposed in passageway 18 between inlet 14 and outlet 16 and a cage 22 is disposed within valve body 12 adjacent valve seat 24. A fluid control member, such as valve plug 26, is positioned within valve body 12 and is disposed within cage 22. Valve plug 26 interacts with the valve seat 24 to control fluid flow through the valve body 12, such that valve plug 26 is moveable between a closed position where valve plug 26 sealingly engages valve seat 24 and an open position where valve plug 26 is spaced away from valve seat 24. A stem 28 is connected to valve plug 26 at one end and to an actuator at another end. The actuator controls movement of valve plug 26 within cage 22. The cage 22 is positioned adjacent valve seat 24 and proximate valve plug 26 to provide guidance for valve plug 26.

Figure 2:
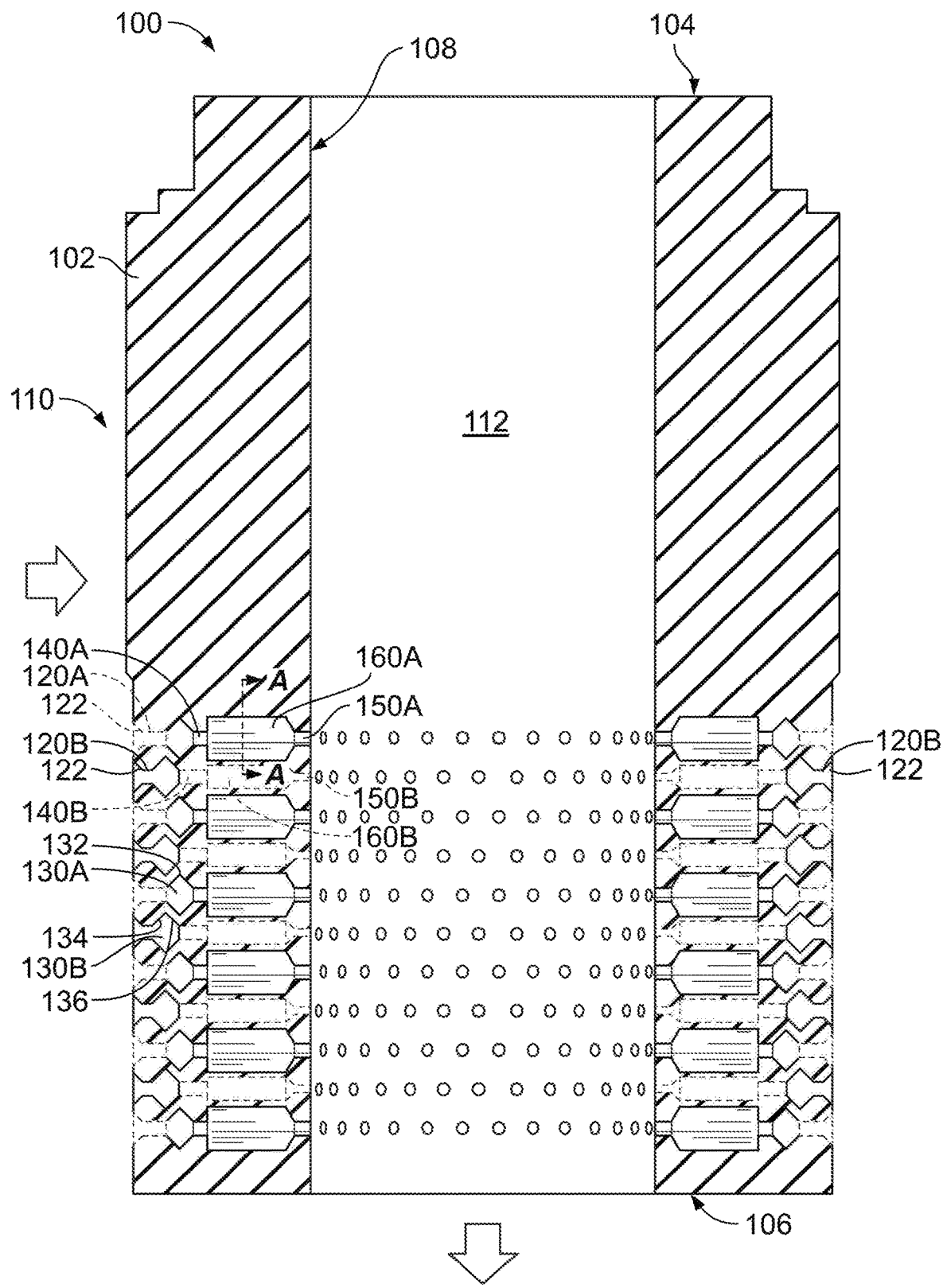
FIG. 2 is a cross-sectional view of an example cage that can be used with the control valve of FIG. 1.
Figure 3:
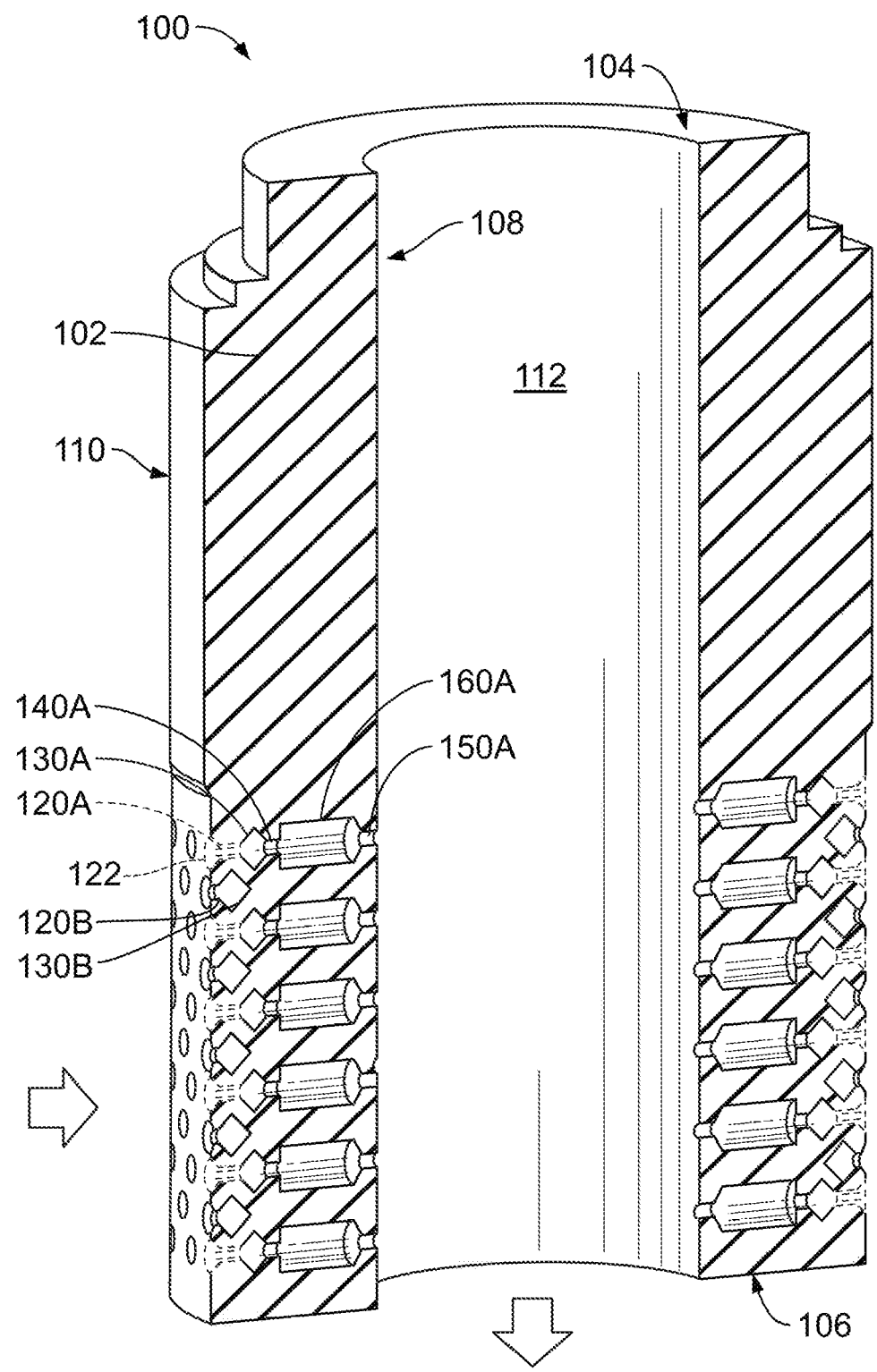
FIG. 3 is a perspective cross-sectional view of the cage of FIG. 2.
Figure 4:
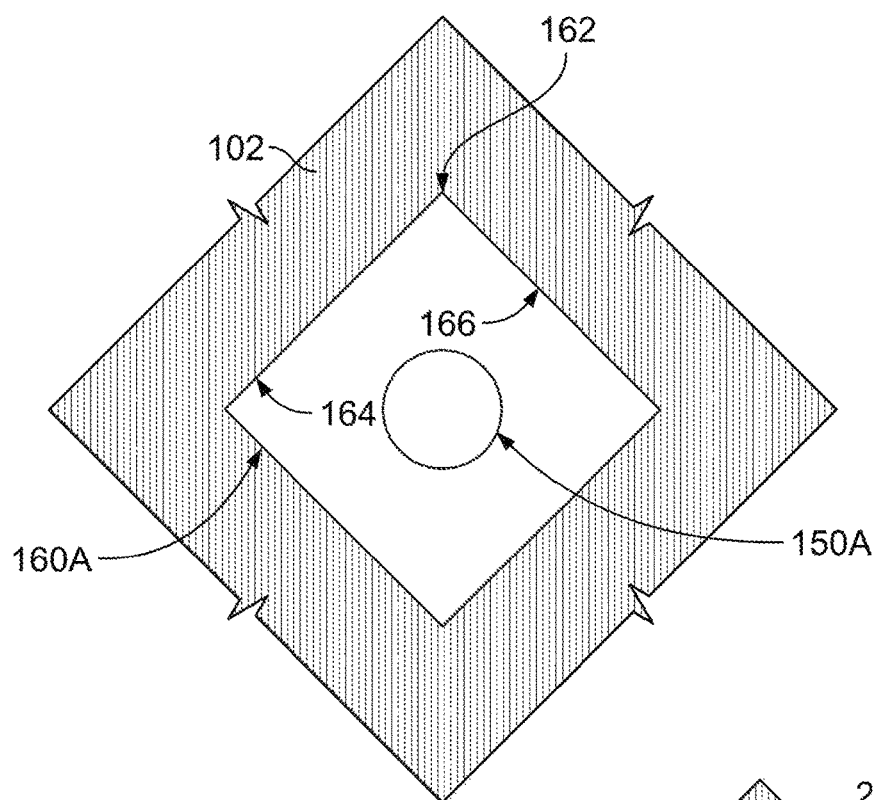
FIG. 4 is a partial cross-sectional view of the cage of FIG. 2 taken along line A-A of FIG. 2.

Referring to FIGS. 2-4, one example of a multiple stage anti-cavitation cage 100 having three pressure drops is shown that can be used as cage 22 in control valve 10 for high pressure applications. As noted above, cage 100 is a single, unitary component that does not require assembly as do current multiple stage anti-cavitation cage designs. As shown, cage 100 is designed for use in a "flow down" orientation or application, where the fluid flows into control valve 10 through outlet 16, flows through cage 100 from the outside to the center of the cage 100, and exits control valve 10 through inlet 14.

Cage 100 can be manufactured using Additive Manufacturing Technology, such as direct metal laser sintering, full melt powder bed fusion, laser powder bed fusion, etc., which allows cage 100 to be manufactured as a single, unitary piece, which reduces the manufacturing lead time, complexity, and cost. Using an Additive Manufacturing Technology process, the 3-dimensional CAD file of cage 100 is sliced/divided into multiple layers 2D. For example layers approximately 20-60 microns thick. A powder bed, such as a powder based metal, is then laid down representing the first layer of the design and a laser or electron beam sinters together the design of the first layer. A second layer of powder, representing the second layer of the design, is then laid down over the first sintered layer. The second layer of powder is then sintered/fused together with the first layer. This continues layer after layer to form the completed cage 100. Using an Additive Manufacturing Technology process to manufacture cages for control valves allows the freedom to produce passages having various shapes and geometries, and other feature described below, that are not possible using current standard casting or drilling techniques.

As shown in FIGS. 2-3, cage 100 generally includes a solid, unitary circumferential wall 102 forming a hollow central bore 112, within which the valve plug 26 will slide to control fluid flow through cage 100. Wall 102 defines a first end 104, an opposing second end 106, an inner surface 108, and an opposing outer surface 110. Pathways are formed through wall 102 between the inner surface 108 and outer surface 110 and include inlet passages 120A, 120B, annular cavities 130A, 130B, intermediate passages 140A, 140B, recovery plenums 160A, 160B, and outlet passages 150A, 150B.

Inlet passages 120A, 120B are positioned adjacent outer surface 110, extend radially into wall 102 from outer surface 110, and preferable have an end 122 adjacent outer surface 110 that is chamfered with a leading edge radius. In the example shown, inlet passages 120A, 120B are cylindrical, but can be any shape desired for a particular application. In addition, a first set of inlet passages 120A can be radially and longitudinally offset from a second set of inlet passages 120B, such that the first and second sets of inlet passages 120A, 120B each connect to separate, offset annular cavities 130A, 130B, as discussed in more detail below.

Annular cavities 130A, 130B are spaced apart from inner surface 108, outer surface 110, first end 104, and second end 106 of wall 102 and are connected to inlet passages 120A, 120B and respective intermediate passages 140A, 140B. A first set of annular cavities 130A are offset from a second set of annular cavities 130B such that adjacent annular cavities 130A, 130B are radially and longitudinally offset from each other. Given the different positioning of the first set of annular cavities 130A and the second set of annular cavities 130B, the first set of inlet passages 120A connected to the first set of annular cavities 130A will have a longer length than the second set of inlet passages 120B connected to the second set of annular cavities 130B. Annular cavities 130A, 130B have larger area than inlet passages 120A, 120B and act as a recovery plenum to provide a first pressure drop as fluid flows between inlet passages 120A, 120B and outlet passages 130A, 130B.

To assist in the formation of annular cavities 130A, 130B using Additive Manufacturing Technology, annular cavities 130A, 130B also preferably have a cross-sectional shape that has a corner 132 at the vertex (the highest point, apex, or top) of each annular cavity 130A, 130B. In the particular example shown, annular cavities 130A, 130B have cross-sectional shapes that are diamond shaped and each has two planar surfaces 134, 136 that meet at a corner 132 at the vertex of each annular cavity 130A, 130B.

Intermediate passages 140A, 140B are connected to annular cavities 130A, 130B and are radially offset from corresponding inlet passages 120A, 120B that are connected to the same annular cavity 130A, 130B. In the example shown, intermediate passages 140A, 140B are cylindrical, but can be any shape desired for a particular application. In addition, a first set of intermediate passages 140A can be radially and longitudinally offset from a second set of intermediate passages 140B, such that the first and second sets of intermediate passages 140A, 140B each connect to separate, offset annular cavities 130A, 130B.

Outlet passages 150A, 150B are positioned adjacent inner surface 108 and extend radially into wall 102 from inner surface 108. In the example shown, outlet passages 150A, 150B are cylindrical, but can be any shape desired for a particular application. In addition, like inlet passages 120A, 120B and intermediate passages 140A, 140B, a first set of outlet passages 150A can be radially and longitudinally offset from a second set of outlet passages 150B, such that the first and second sets of outlet passages 150A, 150B each communicate with separate, offset annular cavities 130A, 130B. The flow of fluid from outlet passages 150A, 150B to central bore 112 provide another pressure drop for the fluid flow.

Recovery plenums 160A, 160B interconnect respective intermediate passages 140A, 140B and outlet passages 150A, 150B and have a cross-sectional area that is larger than the cross-sectional area of the intermediate passages 140A, 140B and outlet passages 150A, 150B to which they are connected. The difference in cross-sectional area between intermediate passages 140A, 140B and recovery plenums 160A, 160B provide yet another pressure drop as fluid flows between inlet passages 120A, 120B and outlet passages 150A, 150B. In addition, like inlet passages 120A, 120B and intermediate passages 140A, 140B, a first set of recovery plenums 160A can be radially and longitudinally offset from a second set of recovery plenums 160B, such that the first and second sets of recovery plenums 160A, 160B each communicate with separate, offset annular cavities 130A, 130B and interconnect respective intermediate passages 140A, 140B and outlet passages 150A, 150B (e.g., recovery plenums 160A interconnect intermediate passages 140A and outlet passages 150A, while recovery plenums 160B interconnect intermediate passages 140B and outlet passages 150B).

To assist in the formation of recovery plenums 160A, 160B using Additive Manufacturing Technology, recovery plenums 160A, 160B also preferably have a cross-sectional shape that has a corner 162 at the vertex (the highest point, apex, or top) of each recovery plenum 160A, 160B. As best seen in FIG. 4, in the particular example shown, recovery plenums 160A, 160B have cross-sectional shapes that are diamond shaped and each has two planar surfaces 164, 166 that meet at a corner 162 at the vertex of each recovery plenum 160A, 160B.

Figure 7:
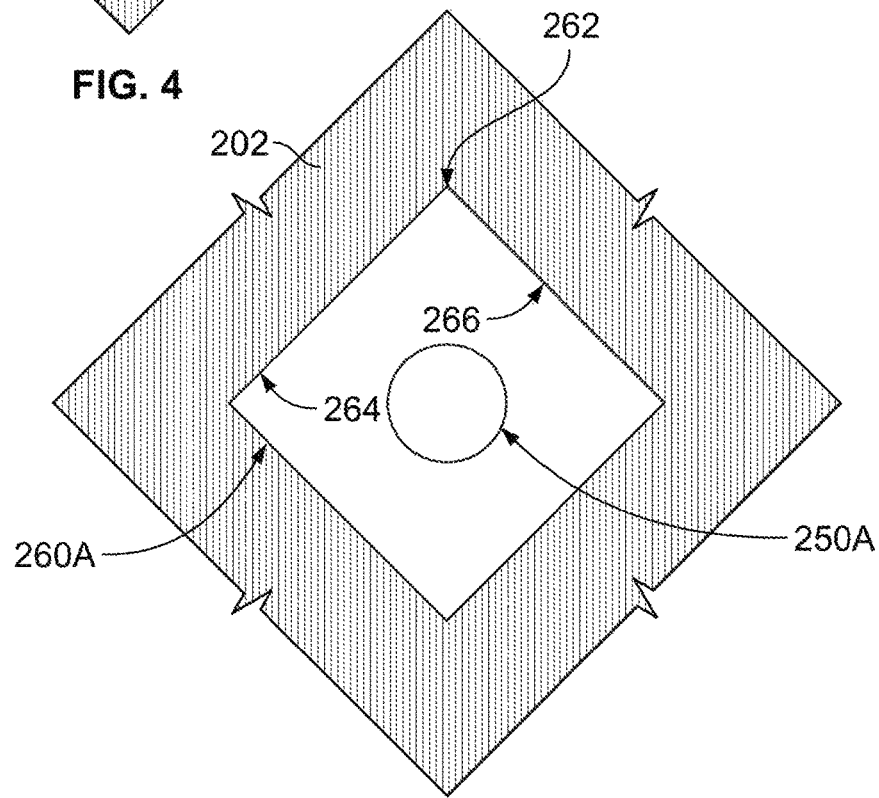
FIG. 7 is a partial cross-sectional view of the cage of FIG. 5 taken along line B-B of FIG. 5.
Figure 5:
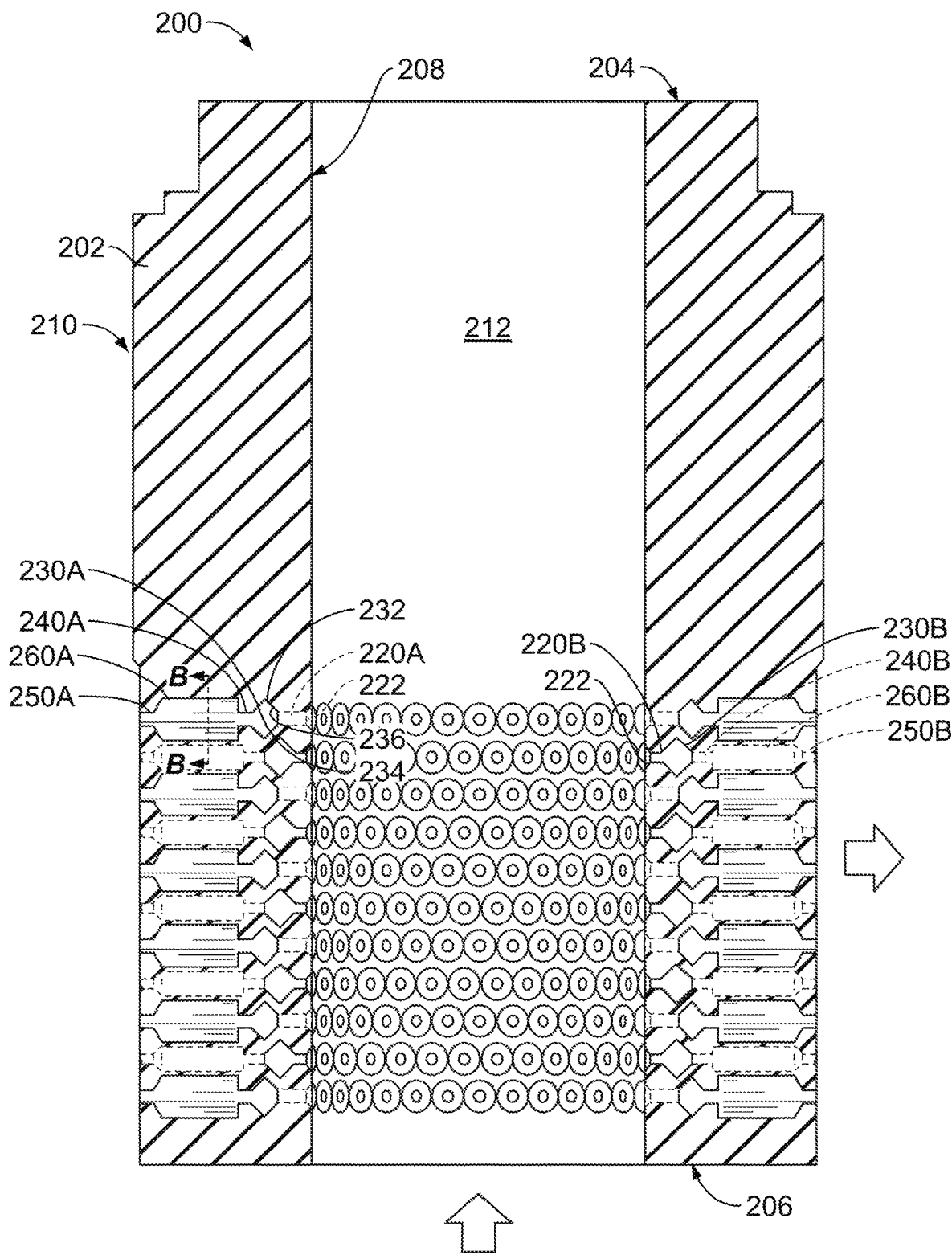
FIG. 5 is a cross-sectional view of another example cage that can be used with the control valve of FIG. 1.
Figure 6:
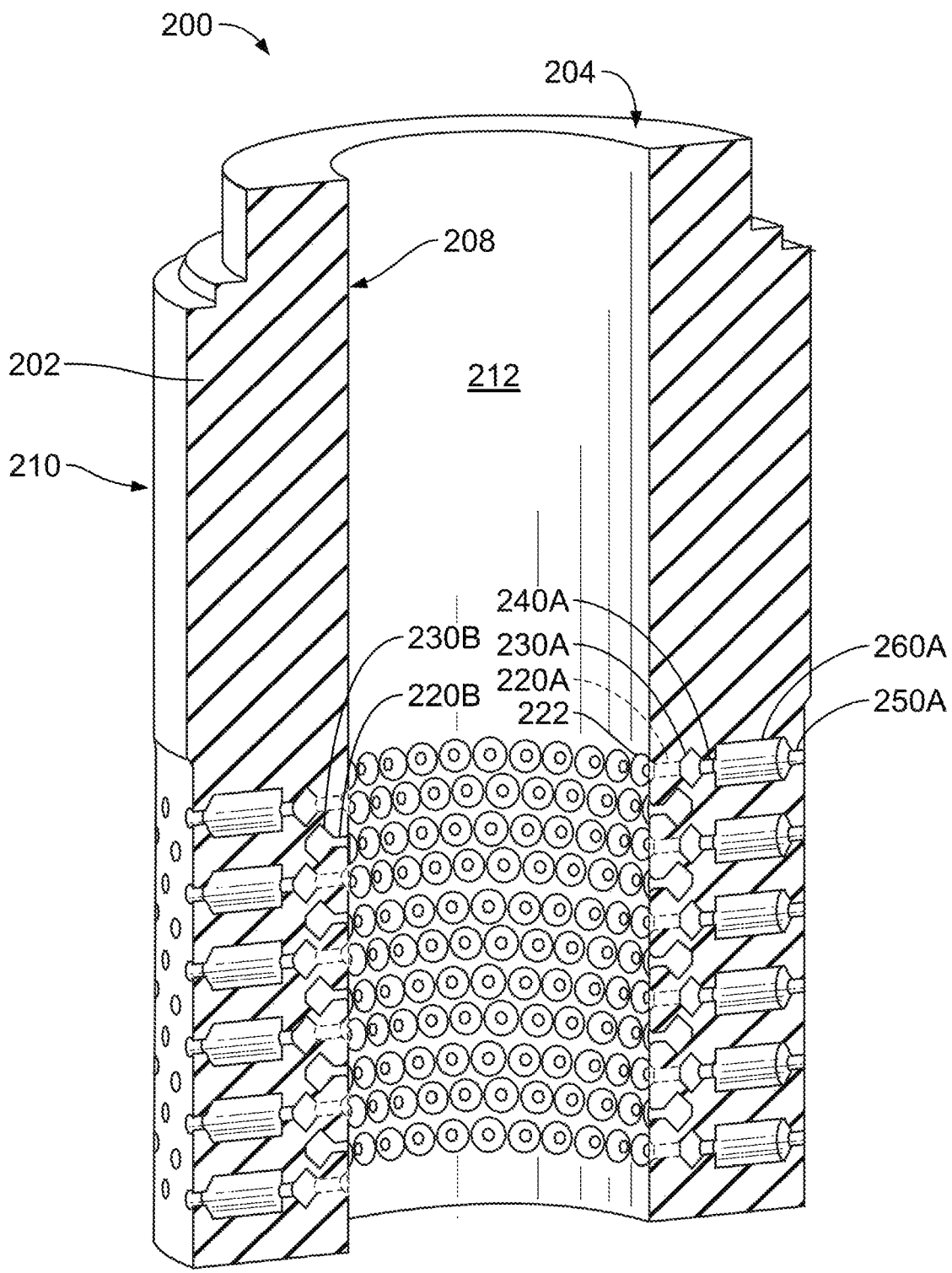
FIG. 6 is a perspective cross-sectional view of the cage of FIG. 5.

Referring to FIGS. 5-7, another example of a multiple stage anti-cavitation cage 200 having three pressure drops is shown that can be used as cage 22 in control valve 10 for high pressure applications. Cage 200 is generally the same as cage 100, except the pathways through cage 200 are reversed so that cage 200 is design for use in a "flow up" orientation or application, where the fluid flows into control valve 10 through inlet 14, flows through cage 200 from the center to the outside of the cage 200, and exits control valve 10 through outlet 16. Cage 200 is a single, unitary component that does not require assembly or additional finishing processes as do current multiple stage anti-cavitation cage designs.

As discussed above for cage 100, cage 200 can also be manufactured using Additive Manufacturing Technology, such as direct metal laser sintering, full melt powder bed fusion, laser powder bed fusion, etc., which allows cage 200 to be manufactured as a single, unitary piece, which reduces the manufacturing lead time, complexity, and cost.

As shown in FIGS. 5-6, cage 200 generally includes a solid, unitary circumferential wall 202 forming a hollow central bore 212, within which the valve plug 26 will slide to control fluid flow through cage 200. Wall 202 defines a first end 204, an opposing second end 206, an inner surface 208, and an opposing outer surface 210. Pathways are formed through wall 202 between the outer surface 210 and the inner surface 208 and include inlet passages 220A, 220B, annular cavities 230A, 230B, intermediate passages 240A, 240B, recovery plenums 260A, 260B, and outlet passages 250A, 250B.

Inlet passages 220A, 220B are positioned adjacent inner surface 208, extend radially into wall 202 from inner surface 208, and preferable have an end 222 adjacent inner surface 208 that is chamfered. In the example shown, inlet passages 220A, 220B are cylindrical, but can be any shape desired for a particular application. In addition, a first set of inlet passages 220A can be radially and longitudinally offset from a second set of inlet passages 220B, such that the first and second sets of inlet passages 220A, 220B each connect to separate, offset annular cavities 230A, 230B, as discussed in more detail below.

Annular cavities 230A, 230B are spaced apart from inner surface 208, outer surface 210, first end 204, and second end 206 of wall 202 and are connected to inlet passages 220A, 220B and respective intermediate passages 240A, 240B. A first set of annular cavities 230A are offset from a second set of annular cavities 230B such that adjacent annular cavities 230A, 230B are radially and longitudinally offset from each other. Given the different positioning of the first set of annular cavities 230A and the second set of annular cavities 230B, the first set of inlet passages 220A connected to the first set of annular cavities 230A will have a longer length than the second set of inlet passages 220B connected to the second set of annular cavities 230B. Annular cavities 230A, 230B have a larger area than inlet passages 220A, 220B and act as a recovery plenum to provide a first pressure drop as fluid flows between inlet passages 220A, 220B and outlet passages 230A, 230B.

To assist in the formation of annular cavities 230A, 230B using Additive Manufacturing Technology, annular cavities 230A, 230B also preferably have a cross-sectional shape that has a corner 232 at the vertex (the highest point, apex, or top) of each annular cavity 230A, 230B. In the particular example shown, annular cavities 230A, 230B have cross-sectional shapes that are diamond shaped and each has two planar surfaces 234, 236 that meet at a corner 232 at the vertex of each annular cavity 230A, 230B.

Intermediate passages 240A, 240B are connected to annular cavities 230A, 230B and are radially offset from corresponding inlet passages 220A, 220B that are connected to the same annular cavity 230A, 230B. In the example shown, intermediate passages 240A, 240B are cylindrical, but can be any shape desired for a particular application. In addition, a first set of intermediate passages 240A can be radially and longitudinally offset from a second set of intermediate passages 240B, such that the first and second sets of intermediate passages 240A, 240B each connect to separate, offset annular cavities 230A, 230B.

Outlet passages 250A, 250B are positioned adjacent outer surface 210 and extend radially into wall 202 from outer surface 210. In the example shown, outlet passages 250A, 250B are cylindrical, but can be any shape desired for a particular application. In addition, like inlet passages 220A, 220B and intermediate passages 240A, 240B, a first set of outlet passages 250A can be radially and longitudinally offset from a second set of outlet passages 250B, such that the first and second sets of outlet passages 250A, 250B each communicate with separate, offset annular cavities 230A, 230B. The flow of fluid from outlet passages 250A, 250B out of cage 200 provides another pressure drop for the fluid flow.

Recovery plenums 260A, 260B interconnect respective intermediate passages 240A, 240B and outlet passages 250A, 250B and have a cross-sectional area that is larger than the cross-sectional area of the intermediate passages 240A, 240B and outlet passages 250A, 250B to which they are connected. The difference in cross-sectional area between intermediate passages 240A, 240B and recovery plenums 260A, 260B provide yet another pressure drop as fluid flows between inlet passages 220A, 220B and outlet passages 250A, 250B. In addition, like inlet passages 220A, 220B and intermediate passages 240A, 240B, a first set of recovery plenums 260A can be radially and longitudinally offset from a second set of recovery plenums 260B, such that the first and second sets of recovery plenums 260A, 260B each communicate with separate, offset annular cavities 230A, 230B and interconnect respective intermediate passages 240A, 240B and outlet passages 250A, 250B (e.g., recovery plenums 260A interconnect intermediate passages 240A and outlet passages 250A, while recovery plenums 260B interconnect intermediate passages 240B and outlet passages 250B).

To assist in the formation of recovery plenums 260A, 260B using Additive Manufacturing Technology, recovery plenums 260A, 260B also preferably have a cross-sectional shape that has a corner 262 at the vertex (the highest point, apex, or top) of each recovery plenum 260A, 260B. As best seen in FIG. 7, in the particular example shown, recovery plenums 260A, 260B have cross-sectional shapes that are diamond shaped and each has two planar surfaces 264, 266 that meet at a corner 262 at the vertex of each recovery plenum 260A, 260B.

While various embodiments have been described above, this disclosure is not intended to be limited thereto. Variations can be made to the disclosed embodiments that are still within the scope of the appended claims.

What is claimed is:

1. A control valve, comprising:
    a valve body having an inlet and an outlet;
    a valve seat positioned in a passageway of the valve body between the inlet and the outlet;
    a valve plug positioned within the valve body and movable between a closed position, in which the valve plug sealingly engages the valve seat, and an open position, in which the valve plug is spaced away from the valve seat; and
    a cage that is a single-piece, unitary, integrally formed component disposed within the valve body adjacent the valve seat and proximate the valve plug to provide guidance for the valve plug, the cage comprising:
        a solid, unitary, integrally formed, single-piece circumferential wall having an inner surface and an outer surface;
        a plurality of inlet passages adjacent the inner surface;
        a continuous annular cavity spaced apart from the inner surface and the outer surface and connected to the plurality of inlet passages;
        a plurality of intermediate passages connected to the annular cavity;
        a plurality of outlet passages adjacent the outer surface; and
        a plurality of recovery plenums, each of the plurality of recovery plenums interconnecting a single one of the intermediate passages and a single one of the outlet passages, wherein the plurality of recovery plenums each have a cross-sectional area that is larger than a cross-sectional area of the intermediate passages and a cross-sectional area of the outlet passages.

2. The control valve of claim 1, wherein one end of each of the plurality of inlet passages is chamfered.

3. The control valve of claim 1, comprising:
    a second plurality of inlet passages adjacent one of the inner surface or the outer surface and longitudinally offset from the plurality of inlet passages;
    a second annular cavity spaced apart from the inner surface and the outer surface and connected to the second plurality of inlet passages, the second annular cavity longitudinally and radially offset from the annular cavity;
    a second plurality of intermediate passages connected to the second annular cavity;

a second plurality of outlet passages adjacent the other of the inner surface or the outer surface and longitudinally offset from the plurality of outlet passages; and a second plurality of recovery plenums interconnecting the second intermediate passages and the second outlet passages, wherein the second plurality of recovery plenums each have a cross-sectional area that is larger than a cross-sectional area of the second intermediate passages and a cross-sectional area of the second outlet passages.

4. The control valve of claim 1, wherein the annular cavity has a cross-sectional shape having a corner at a vertex.

5. The control valve of claim 1, wherein the plurality of recovery plenums each have a cross-sectional shape having a corner at a vertex.

6. A cage for a control valve, the cage comprising:
a solid, unitary, integrally formed, single-piece circumferential wall having an inner surface and an outer surface, the circumferential wall forming the cage as a single, unitary component;
a plurality of inlet passages adjacent the inner surface;
a continuous annular cavity spaced apart from the inner surface and the outer surface and connected to the plurality of inlet passages;
a plurality of intermediate passages connected to the annular cavity;
a plurality of outlet passages adjacent the outer surface; and
a plurality of recovery plenums, each of the plurality of recovery plenums interconnecting a single one of the intermediate passages and a single one of the outlet passages, wherein the plurality of recovery plenums each have a cross-sectional area that is larger than a cross-sectional area of the intermediate passages and a cross-sectional area of the outlet passages.

7. The cage of claim 6, wherein one end of each of the plurality of inlet passages is chamfered.

8. The cage of claim 6, comprising:
a second plurality of inlet passages adjacent one of the inner surface or the outer surface and longitudinally offset from the plurality of inlet passages;
a second annular cavity spaced apart from the inner surface and the outer surface and connected to the second plurality of inlet passages, the second annular cavity longitudinally and radially offset from the annular cavity;
a second plurality of intermediate passages connected to the second annular cavity;
a second plurality of outlet passages adjacent the other of the inner surface or the outer surface and longitudinally offset from the plurality of outlet passages; and
a second plurality of recovery plenums interconnecting the second intermediate passages and the second outlet passages, wherein the second plurality of recovery plenums each have a cross-sectional area that is larger than a cross-sectional area of the second intermediate passages and a cross-sectional area of the second outlet passages.

9. The cage of claim 6, wherein the annular cavity has a cross-sectional shape having a corner at a vertex.

10. The cage of claim 6, wherein the plurality of recovery plenums each have a cross-sectional shape having a corner at a vertex.

11. A control valve, comprising:
a valve body having an inlet and an outlet;
a valve seat positioned in a passageway of the valve body between the inlet and the outlet;
a valve plug positioned within the valve body and movable between a closed position, in which the valve plug sealingly engages the valve seat, and an open position, in which the valve plug is spaced away from the valve seat; and
a cage that is a single-piece, unitary, integrally formed component disposed within the valve body adjacent the valve seat and proximate the valve plug to provide guidance for the valve plug, the cage comprising:
a solid, unitary, integrally formed, single-piece circumferential wall having an inner surface and an outer surface;
a plurality of inlet passages adjacent the inner surface;
a plurality of outlet passages adjacent the outer surface;
a continuous annular cavity spaced apart from the inner surface and the outer surface and connected to the plurality of inlet passages; and
a plurality of means for providing a second pressure drop between the plurality of inlet passages and the plurality of outlet passages each of the plurality of means for providing a second pressure drop connected to a single one of the plurality of outlet passages.

12. The control valve of claim 11, wherein the means for providing a second pressure drop between the plurality of inlet passage and the plurality of outlet passages comprises: a plurality of recovery plenums, each recovery plenum connected to one of the plurality of outlet passages; and a plurality of intermediate passages interconnecting the annular cavity and the plurality of recovery plenums;
wherein the plurality of recovery plenums each have a cross-sectional area that is larger than a cross-sectional area of the intermediate passages and a cross-sectional area of the outlet passages.

13. The control valve of claim 12, wherein:
the annular cavity has a cross-sectional shape having a corner at a vertex; and
the plurality of recovery plenums each have a cross-sectional shape having a corner at a vertex.

* * * * *

UNITED STATES PATENT AND TRADEMARK OFFICE
CERTIFICATE OF CORRECTION

PATENT NO. : 10,900,591 B2
APPLICATION NO. : 15/721526
DATED : January 26, 2021
INVENTOR(S) : Thomas N. Gabriel et al.

It is certified that error appears in the above-identified patent and that said Letters Patent is hereby corrected as shown below:

On the Title Page

Item (57), Line 12, "a cross-sectional areas" should be -- cross-sectional areas --.

In the Specification

Column 1, Lines 39-41, "is was" should be -- is --.

Column 5, Line 3, "1606" should be -- 160B --.

Column 5, Line 4, "1506" should be -- 150B --.

Column 5, Line 5, "1206" should be -- 120B --.

Column 5, Line 22, "1306" should be -- 130B --.

Column 5, Line 25, "1306" should be -- 130B --.

Column 5, Line 31, "1206" should be -- 120B --.

Column 5, Line 32, "1306" should be -- 130B --.

Column 5, Line 41, "1306" should be -- 130B --.

Column 5, Line 43, "1306" should be -- 130B --.

Column 5, Line 44, "1206" should be -- 120B --.

Column 5, Line 52, "1306" should be -- 130B --.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,900,591 B2

Column 5, Line 63, "1506" should be -- 150B --.

Column 5, Line 66, "1606" should be -- 160B --.

Column 6, Line 1, "1506" should be -- 150B --.

Column 6, Line 3, "1506" should be -- 150B --.

Column 6, Line 14, "1306" should be -- 130B --.

Column 6, Line 18, "1606" should be -- 160B --.

Column 6, Line 18, "1406" should be -- 140B --.

Column 6, Line 29, "1606" should be -- 160B --.

Column 8, Line 12, "2606" should be -- 260B --.

Column 8, Line 17, "2606" should be -- 260B --.